Aug. 24, 1926.
J. GARCIN
1,597,593
MOVING PICTURE BOOK
Filed July 11, 1924    3 Sheets-Sheet 1
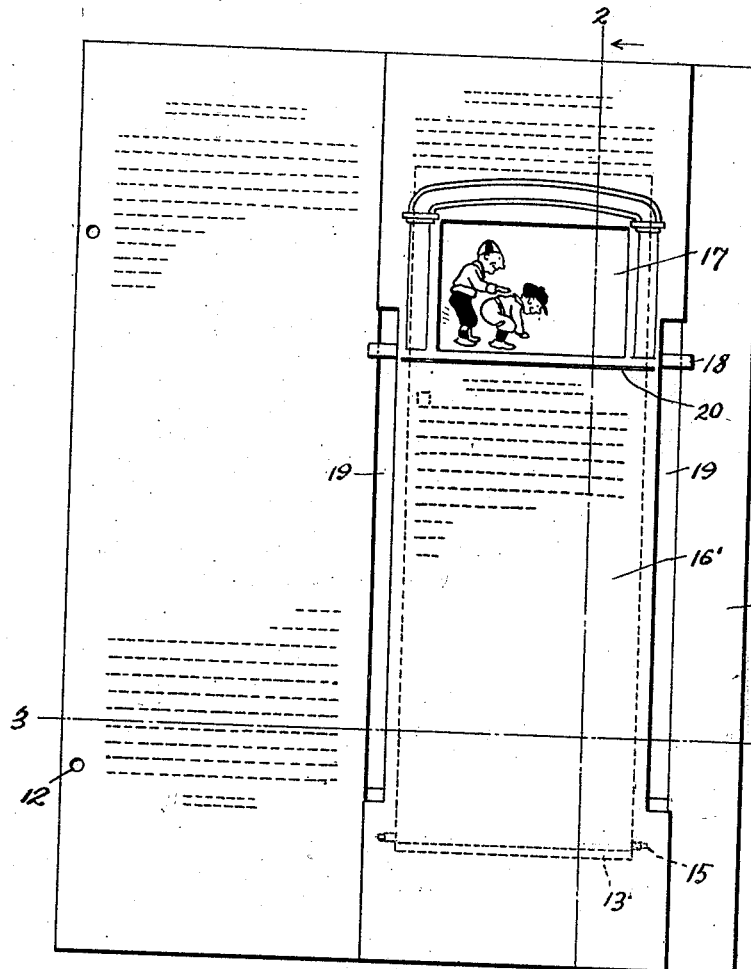
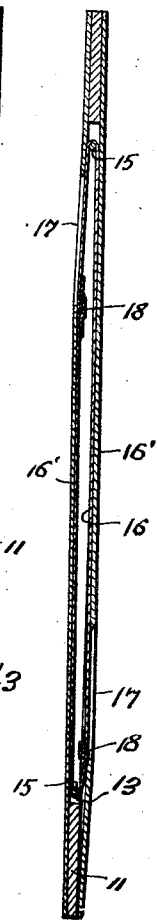
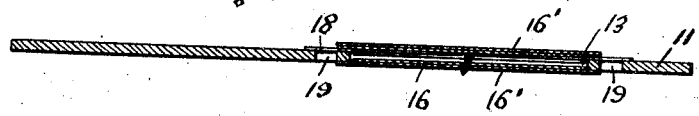
John Garcin, INVENTOR
BY Victor J. Evans
ATTORNEY
WITNESS: Gerald Henney.

Aug. 24, 1926.

J. GARCIN 1,597,593

MOVING PICTURE BOOK

Filed July 11, 1924      3 Sheets-Sheet 2

John Garcin,
INVENTOR

BY Victor J. Evans
ATTORNEY

WITNESS: Gerald Hennesy

Aug. 24, 1926.
J. GARCIN
1,597,593
MOVING PICTURE BOOK
Filed July 11, 1924    3 Sheets-Sheet 3
Fig. 5.    Fig. 6.
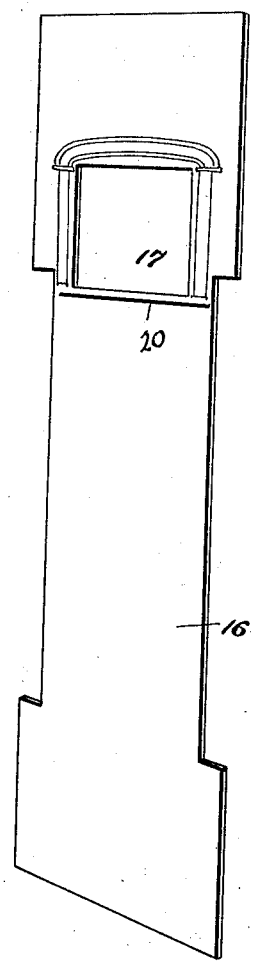
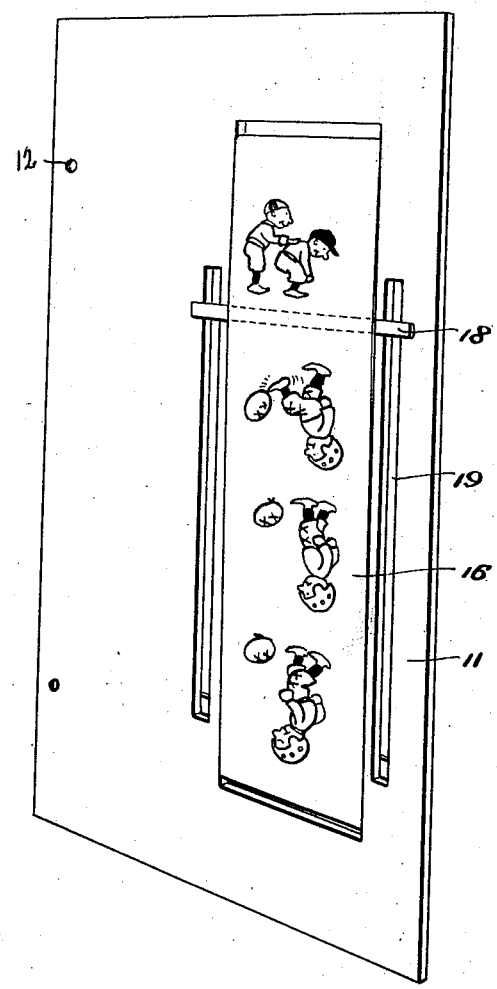
Fig. 8.
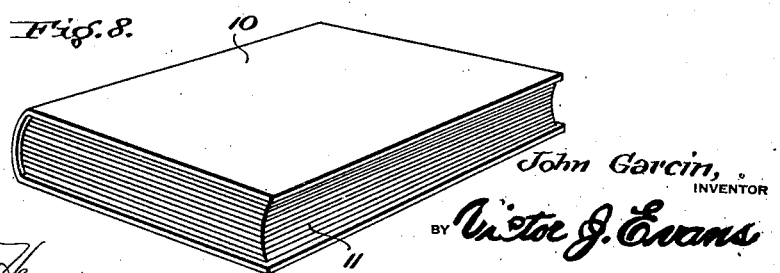
John Garcin,
INVENTOR
BY Victor J. Evans
ATTORNEY
WITNESS: Gerald Hennesy Patented Aug. 24, 1926.

1,597,593

UNITED STATES PATENT OFFICE.

JOHN GARCIN, OF DENVER, COLORADO.

MOVING-PICTURE BOOK.

Application filed July 11, 1924. Serial No. 725,473.

This invention relates to books and has for an object the provision of a book which will be both amusing and educational in character and which is adapted to contain a number of pictures, illustrations or other matter mounted for movement over the pages of the book and capable of being singly and successively brought into view, so that the invention provides in effect a moving picture book, or a book in which the pictures may be moved over the pages.

In addition, the invention aims to provide a book in which the leaves may be permanently or removably secured, or, instead of being arranged in book form, the leaves may be in the form of cards with the pictures arranged in the manner above stated.

With the above and other objects in view, the invention further includes the following novel features and details of construction, to be hereinafter more fully described, illustrated in the accompanying drawings and pointed out in the appended claims.

In the drawings:—
Figure 1 is an elevation of one of the leaves of a moving picture book constructed in accordance with the invention.

Figure 2 is a section on the line 2—2 of Figure 1.
Figure 3 is a section on the line 3—3 of Figure 1.

Figure 5 is a detail perspective view of the cover sheet.

Figure 6 is a detail perspective view of one of the leaves with the cover sheet removed.

Figure 8 is a detail perspective view of the book.
Referring in detail to the drawings wherein like characters of reference denote corresponding parts, the invention is shown as comprising a loose leaf book, the book being indicated at 10 in Figure 8 of the drawings and provided with a plurality of leaves 11.

Figure 4:
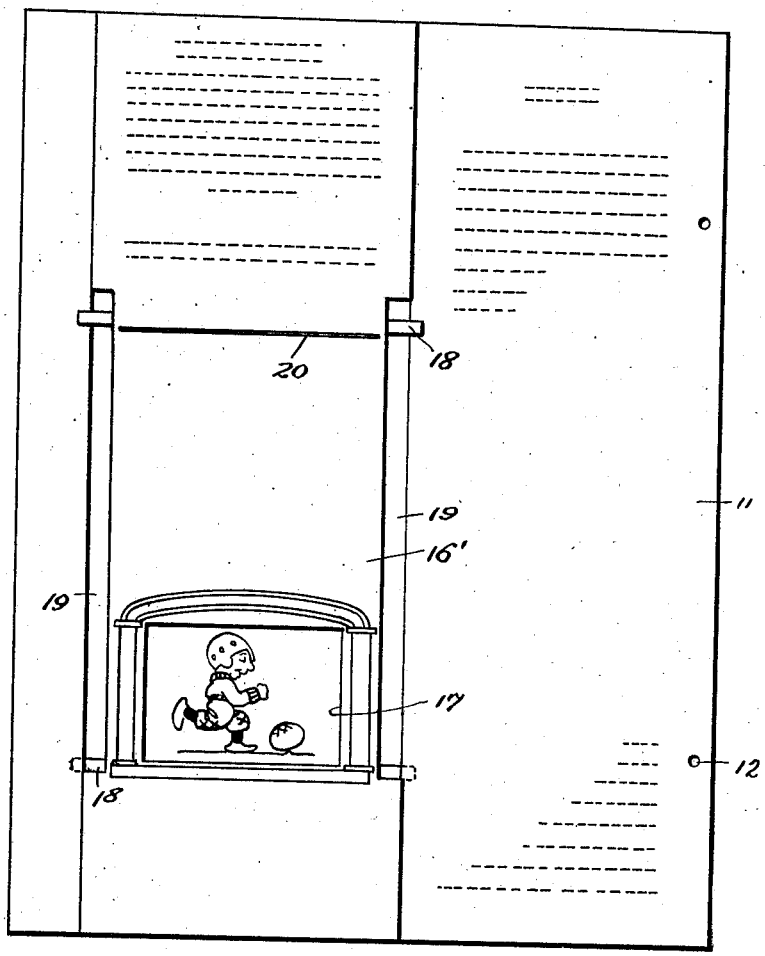
Figure 4 is an elevation showing the reverse side or reverse page of the book leaf shown in Figure 1.
Figure 7:
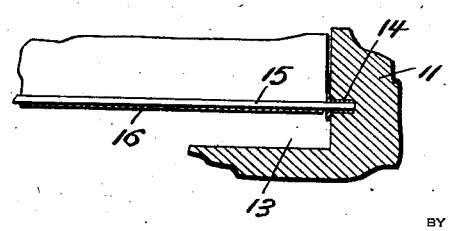
Figure 7 is a fragmentary perspective view illustrating the manner of mounting the strip or supporting roller.

These leaves are shown in detail in various figures of the drawings and are illustrated as being provided with holes 12 for the passage of securing devices (not shown). These devices may be of any suitable character such as is commonly employed in a loose leaf book, although it is of course obvious that the leaves may be permanently secured.

These leaves 11 may be of any suitable material and it may be here stated that instead of making the invention in book form the leaves may be made in the form of cards.

Each leaf or card is provided with an opening 13 and mounted in bearing thimbles 14 in the opposite side edges of the openings are anti-friction elements or rollers 15. Extending around these rollers is an endless strip 16 which is preferably formed of linen or of some other durable flexible material, the strip being visible upon opposite sides of the leaves. The strip 16 is provided with a plurality of pictures which are reversely arranged, that is, the pictures are so arranged that certain of them will be seen in an upright position upon one side of the leaf or one page of the book, while the other pictures will be seen in an upright position upon the opposite side of the leaf or opposite page of the book.

The pictures may be divided into different sets, one set being adapted to be viewed upon one page or one side of the leaf and the other set upon the opposite side and the said pictures may represent a different movement in one and the same action, after the manner of the pictures in animated cartoons. However, the character of the pictures is optional and they may consist of a number of separate pictures which are in no way related, or the strip 16 may have imprinted or otherwise placed thereon information of an instructive, or educational character.

The picture strip 16 is designed to be covered by a cover sheet 16', the latter being provided with a sight opening 17, the sight opening upon one side of the leaf being at the top, while the sight opening upon the opposite side of the leaf is at the bottom, as will be plainly seen from Figures 1 and 4 of the drawings. The sight opening 17 is of a size whereby the pictures may be viewed singly, one picture being within the sight opening while the remaining pictures are beneath the cover sheet.

Secured to the picture strip 16 upon opposite sides of the leaf 11 are transversely disposed bars 18, the opposite ends of which extend beyond the strip 16 and the cover sheet 16 and across slots 19 provided in the leaf adjacent the opposite side edges of the cover sheet. The opposite ends of the cover sheet are secured to the leaf so that the strip 16 will be capable of movement beneath said sheet. The portions of the cover sheets around the openings 17 may be suitably ornamented and may if desired represent the rostrum of a stage so that a picture viewed within the opening may closely simulate a picture projected upon the screen of a theater.

Normally, the bars 18 are positioned near the upper end of the cover sheet substantially parallel with the lines 20, so that one picture will be in proper register with the sight opening. The picture strip 16 is then moved downward with proper rapidity, movement being effected by placing one finger of each hand upon the opposite ends of the bar 18, whereupon the pictures will be seen to pass the sight opening. The slots 19 are for the accommodation of the finger tips. When the bar has reached its limit of downward movement, all of the pictures upon that side of the leaf or page will have been exposed, so that the leaf may be turned and the operation repeated upon this side of the leaf, whereupon the remaining pictures upon the strip will be exposed.

The invention is susceptible of various changes in its form, proportions and minor details of construction and the right is herein reserved to make such changes as properly fall within the scope of the appended claims.

Having described the invention what is claimed is:—

1. A book comprising a plurality of leaves, a cover sheet upon opposite sides of the leaves, said sheet having a sight opening therein, a picture sheet beneath the cover sheet and finger pieces extending from the picture sheet beyond the edges of the cover sheet, whereby said picture sheet may be moved to expose the same through the sight opening.

2. A book comprising a plurality of leaves, a cover sheet upon opposite sides of the leaves, said sheet having a sight opening therein, a picture sheet beneath the cover sheet and having a plurality of pictures thereon and finger pieces extending from the opposite side edges of the picture sheet beneath the cover sheet, whereby said picture sheet may be moved to successively bring the pictures into position within the sight opening.

3. A book comprising a plurality of leaves, a cover sheet upon opposite sides of the leaves, said sheet having a sight opening therein, endless strips extending through the leaves upon opposite sides thereof beneath the cover sheets and having a plurality of pictures thereon adapted to be viewed through the openings of the cover sheets and means whereby the picture strips may be moved to successively bring the pictures into position within the sight openings.

4. A book comprising a plurality of leaves, a cover sheet upon opposite sides of the leaves, said sheet having a sight opening therein, endless strips extending through the leaves upon opposite sides thereof beneath the cover sheets and having a plurality of pictures thereon adapted to be viewed through the openings of the cover sheets and transversely disposed bars secured to the strips and extending beyond the side edges of the cover sheets to provide finger pieces, whereby the picture strips may be moved to successively bring the pictures into position within the sight openings.

5. A book comprising a plurality of leaves having spaced parallel openings therein, anti-friction elements mounted in said openings, endless strips extending through the openings upon opposite sides of the leaves and movable over the anti-friction elements, cover sheets secured over the strips, said cover sheets having relatively offset sight openings therein, pictures upon the endless strips and adapted to be viewed through the openings and means whereby the pictures may be successively moved into position within the sight openings.

6. A book comprising a plurality of leaves having spaced parallel openings therein, anti-friction elements mounted in said openings, endless strips extending through the openings upon opposite sides of the leaves and movable over the anti-friction elements, cover sheets secured over the strips, said cover sheets having sight openings therein, pictures upon the endless strips and adapted to be viewed through the openings, said leaves having slots therein disposed longitudinally of the strips upon opposite sides thereof and spaced transversely disposed bars secured to the strips and extending beyond the side edges of the cover sheets over the slots to provide finger engaging members, whereby the picture strips may be moved to successively bring the pictures into position within the sight openings.

7. An article of the character described comprising a base board having an opening therein, anti-friction elements mounted in said opening, endless strips extending around said anti-friction elements and movable thereover within the opening, cover sheets secured to the base board over the endless strips, said cover sheets having sight openings therein, pictures upon the endless strips and adapted to be viewed through the openings, said base board having slots therein disposed longitudinally of the strips beyond the side edges of the cover sheets, and transversely disposed bars secured to the strips and also extending beyond the side edges of the cover sheets over the slots to provide finger engaging members, whereby the picture strips may be moved to successively bring the pictures into position within the sight openings.

In testimony whereof I affix my signature.

JOHN GARCIN.